United States Patent [19]

Goldman et al.

[11] 4,152,263
[45] May 1, 1979

[54] HEATED WATER CIRCULATOR FOR AQUARIUMS

[75] Inventors: Marvin A. Goldman, Great Neck; Jerome N. Goldman, New York; Silvio J. DiMarchi, Brooklyn, all of N.Y.

[73] Assignee: Penn-Plax Plastics, Inc., Garden City, N.Y.

[21] Appl. No.: 810,096

[22] Filed: Jun. 27, 1977

[51] Int. Cl.² .............................................. E04H 3/16
[52] U.S. Cl. ...................................... 210/169; 119/5; 219/523; 219/318
[58] Field of Search ............... 219/318, 331, 333, 523; 210/167, 169; 119/1, 5

[56] References Cited

U.S. PATENT DOCUMENTS

| | | |
|---|---|---|
| 2,990,808 | 7/1961 | Rumonski .............................. 119/5 X |
| 3,576,426 | 4/1971 | Sesholtz ................................ 219/523 |
| 3,892,200 | 7/1975 | Ramsauer .............................. 119/5 |

Primary Examiner—Volodymyr Y. Mayewsky
Attorney, Agent, or Firm—Mandeville and Schweitzer

[57] ABSTRACT

A directional flow circulator is provided for aquariums for distributing heated water from the heater throughout the aquarium tank. The circulator is positioned concentrically with a heater and serves to collect and distribute heated water through a directional flow spout to the far reaches of the tank to avoid concentrated hot and cold spots in the aquarium tank. The circulator is configured to accommodate any length standard heater, and includes means to fix the circulator on the tank wall at the proper height for the length of the heater used.

6 Claims, 1 Drawing Figure

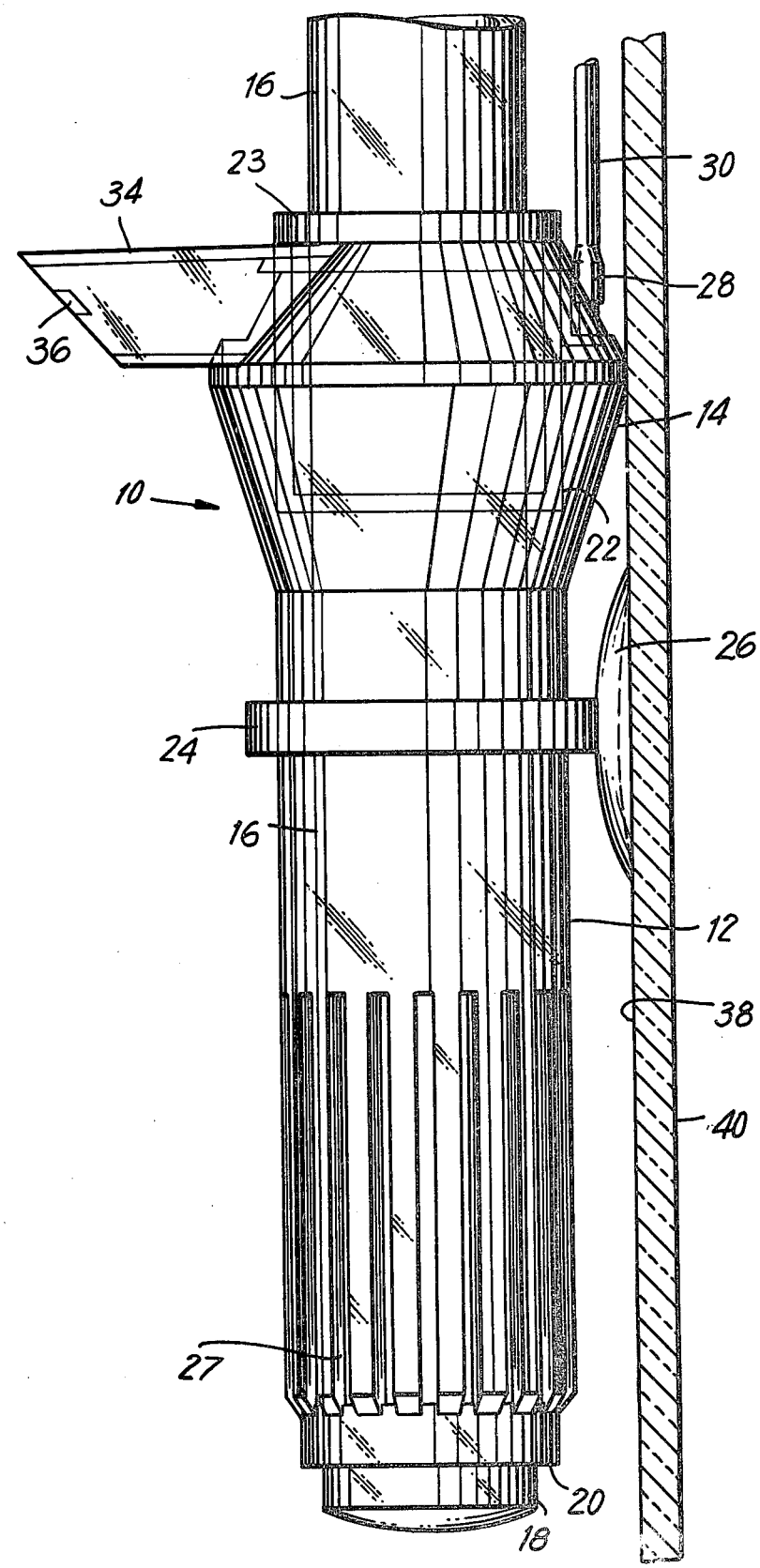

HEATED WATER CIRCULATOR FOR AQUARIUMS

BACKGROUND AND STATEMENT OF THE INVENTION

This invention relates to a circulation device for aquarium tanks for circulating heated water from a source throughout the aquarium tank. More particularly, this invention relates to a heated water distributor device which cooperates with an aquarium heater in order to properly distribute the heated water to all areas of the tank in order to avoid hot and cold spots.

As will be appreciated, in the use of aquariums, particularly for tropical fish and other warm water aquatic life, heated water is required in order to simulate the natural environment of the creatures being sustained in the aquarium. For this reason, heaters have been developed for heating the water in the tank with the heaters positioned in the tank and thermostatically controlled to maintain the proper desired temperature. However, since such heaters must necessarily be positioned in only one place in the tank there is a problem of distribution of the water heated by the heater. That is, water immediately adjacent to the heater will be heated to the proper temperature, or perhaps even higher, while areas furthest removed from the heater will not be so heated unless physical measures are taken to properly distribute the heated water throughout the tank. As will be understood by those who are familiar with tropical fish, these variations in temperature between "hot spots" and "cold spots" can affect significantly the maintenance of such tropical fish and, in some cases, the exposure to temperature variations can cause the death of such fish.

This invention is directed to a device which conforms to and operates in conjunction with an aquarium heater for properly collecting and distributing the water heated by the heater to the furthest removed points in the aquarium tank from the heater in order to provide a continuous flow circulation of the heated water throughout the tank and, simultaneously, to withdraw from all areas of the tank the cooler water for further heating. The device of the invention is concentrically arranged around the heater, and provides for the withdrawal of cold water from the tank, the collection of heated water from the area of the heating filaments of the heater, and the distribution of the heated water from a flow distribution spout to the farthest reaches of the aquarium tank.

The device of the invention includes an arrangement for connecting the heated water circulator of the invention to a pump utilized for aerating the water of the tank so as to enhance the flow of heated water from the flow distribution spout of the circulator. The circulator of the invention is so configured and arranged that it may be utilized with heaters of varying length, as will be appreciated, for accommodating different sized aquarium tanks of differing depths. Moreover, the circulator of the invention includes means for adhering the circulator to the tank wall at a proper elevation in relation to the heater body being utilized for a particular aquarium tank.

As purely illustrative of the invention, one may note the following detailed description of one embodiment of the invention wherein a heated water circulator is positioned on an aquarium tank wall, and showing the positioning relationship of the circulator of the invention to an aquarium heater.

DESCRIPTION OF THE DRAWING

The single drawing shows the circulator of the invention in a side elevational view.

DESCRIPTION OF A PREFERRED EMBODIMENT

Referring to the drawing, the heated water circulator of the invention is generally designated 10 and includes a tubular lower portion 12 with an integral dual reverse conical upper portion 14. As can be seen in the drawing, the circulator 10 is positioned centrically around an aquarium heater 16 and positioned along heater 16 so that only the bottom end 18 of heater 16 extends from the lower end 20 of the circulator of the invention. Arranged in the upper conical portion 14 of the circulator is a tubular collar 22 extending through conical portion 14 and integral with an annular top collar 23 of circulator 10.

Integral with hollow conical upper portion 14 is an air line connector knob 28 which is connected to a flexible air line 30 leading to an aquarium pump, not shown. Also, communicating with the hollow conical upper portion 14, and integral therewith is a directional flow nozzle 34 with openings 36 for directing the flow of heated water in any desired direction in the aquarium tank. In this connection, it is preferable that the direction of flow is to the furthest point in the tank from the heater position. The collar 22 serves to distribute air from connection 28 concentrically of circulator 10 to properly distribute the incoming air with the upflowing heated water in tube 12 for expelling the heated water from nozzle 34.

Concentrically arranged around the lower tubular portion 12 of circulator 10 is a suction cup ring 24 carrying a suction cup 26 for engagement with the inside surface 38 of an aquarium tank wall 40. Preferably, the ring 24 and integral suction cup 26 are comprised of an elastomeric material which engages the outer surface of tubular portion 12 of circulator 10 adjustably so that the suction ring 24 may be moved along tube 12 for positioning the circulator 10. The lower portion of tubular portion 12 of circulator 10 includes a plurality of circumferentially spaced slots or openings 27 for drawing water from the tank to the area adjacent heater 16. In this connection, although circulator 10 is shown as a tube, it will be appreciated that it may have a square cross section as well.

In positioning and operating the circulator of the invention, first the heater 16 is positioned along aquarium wall and suspended over the top edge of the circulator in the usual manner. Subsequent to the desired positioning of heater 16, the circulator 10 of the invention is moved concentrically and upwardly along heater 16 so that only a small tip portion 18 of the heater 16 extends from the lower end 20 of the circulator. After the proper positioning is made, the suction cup 26 is adhered to the surface 38 to maintain the positioning of the circulator 10 in relation to the heater 16. Thereafter, the hose 30 may be connected to the connector 28 and the heater turned on. The air flow through line 30 is preferably adjusted to provide a gentle flow of bubbles. This initiates circulation of the water through the circulator 10 which is drawn through the slots 27 at the bottom thereof and passes upwardly between the outer surface of heater 16 and the inner surface of circulator 10. As the heated water rises, it is caused to flow between the collar 22 and the inner surface of conical portion 14 and into the distribution spout 34 and out through the openings 36 thereof. Because of the frictional engagement of ring 24 with the outer surface of tubular portion 12, the circulator 10 may be rotated to position and direct spout 34 to cause flow of heated water to the furthest point in the aquarium from heater 16. This causes a continuous and even distribution of heated water out of openings 36, throughout the aquarium tank, and then back through slots 27 for subsequent heating according to the preset temperature of heater 16, as will be understood.

The heater of the invention may be comprised of a variety of material, as will be understood, as long as those materials are formulated to withstand the environment in which the circulator of the invention is used. Representative of such materials include filled thermoplastics to provide the proper desired color and rigidity for the circulator, as well as the properties to withstand the moisture and heat of the environment of the circulator. Preferably, the material is clear so as to provide a visual showing of the air bubbles during operation of the circulator in order to allow for ease of adjustment of the air flow through line 30 to the circulator.

Thus, as will be apparent from the foregoing, there is provided in accordance herewith, a circulator device for properly gathering and distributing the heated water from adjacent the heater in an aquarium tank and thus avoiding hot and cold spots in the aquarium tank, and maintaining equalized temperatures throughout the aquarium. Moreover, because of the proper circulation of the heated water, the heater efficiency is increased and false thermostatic readings and reactions are avoided. Also, because the circulator causes a flow of water past the tube of the heater, there is a reduction in mineral build up on the heater glass in hard water areas. In addition, the circulator of the invention is universal in relation to its use with a variety of different sized standard aquarium heaters.

While the form of apparatus herein disclosed forms a preferred embodiment of the invention, the invention is not limited to that form of apparatus and changes can be made therein without departing from the scope of the invention which is defined in the appended claims. For example, the collar 22 may include a resilient washer internally thereof to hold circulator 10 at the desired position along heater tube 16.

We claim:

1. A water circulator for telescopic association with a tubular aquarium heater comprising;
   (a) an elongated tubular body defining a shell and having its lower portion forming a first orifice and its upper portion forming a second orifice;
   (b) said body having a plurality of water intake openings from the outside to the inside adapted to accommodate the flow of water into said tubular body;
   (c) a chamber wall being disposed immediately above said tubular body and circumscribing said body upwardly and outwardly from said tubular body; and
   (d) said chamber wall having an uppermost portion forming a third orifice; and said first, second, and third orifices being located on a common longitudinal axis, and adapted to accommodate therethrough of an aquarium water heater;
   (e) a first tubular collar being centrally positioned within said chamber, said collar having an upper end terminating adjacent the uppermost portion of said chamber wall; said collar extending downward toward the tubular body and forming an annular passage between said collar and said chamber wall for mixing heated water and air;
   (f) a water outlet formed in said chamber wall and adapted to accommodate the flow of water outwardly from said annular passage;
   (g) a nozzle extended from said chamber wall, adjacent said water outlet for directing flow of water from said water outlet;
   (h) a nipple formed in said chamber wall for injection of air;
   (i) the inlet in said nipple for injection of air into said chamber and said unidirectional nozzle being diametrically opposed.

2. The apparatus of claim 1, further including;
   (a) fastening means for rigidly spacing said tubular body from a vertical aquarium tank wall.

3. The apparatus of claim 2, further characterized in that;
   (a) said fastening means comprises a resilient positioning ring frictionally engages the outer surface of said tubular body, and includes suction cup means disposed thereon.

4. The apparatus of claim 1, further characterized in that
   (a) said chamber wall includes a dual reverse conical top area comprised of diverging and converging wall portions.

5. The apparatus of claim 1, further characterized by
   (a) said plurality of water intake openings being vertical slots spaced uniformly about the bottom of said body.

6. The apparatus of claim 1, including
   (a) a second tubular collar defined by said lowermost portion of said tubular body.

* * * * *